Dec. 13, 1966   C. S. GLATFELTER   3,291,255
BUS EMERGENCY STEPS

Filed July 20, 1964   2 Sheets-Sheet 1

INVENTOR.
CARL S. GLATFELTER
BY
Otto Moeller
Attorney

Dec. 13, 1966 C. S. GLATFELTER 3,291,255
BUS EMERGENCY STEPS
Filed July 20, 1964 2 Sheets-Sheet 2
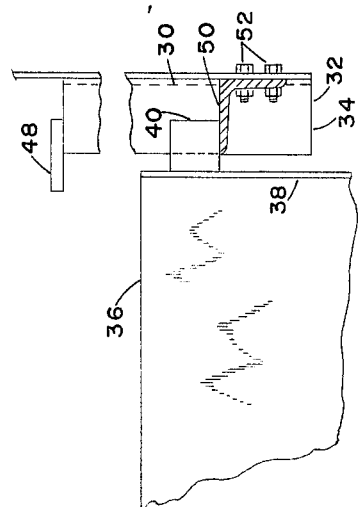
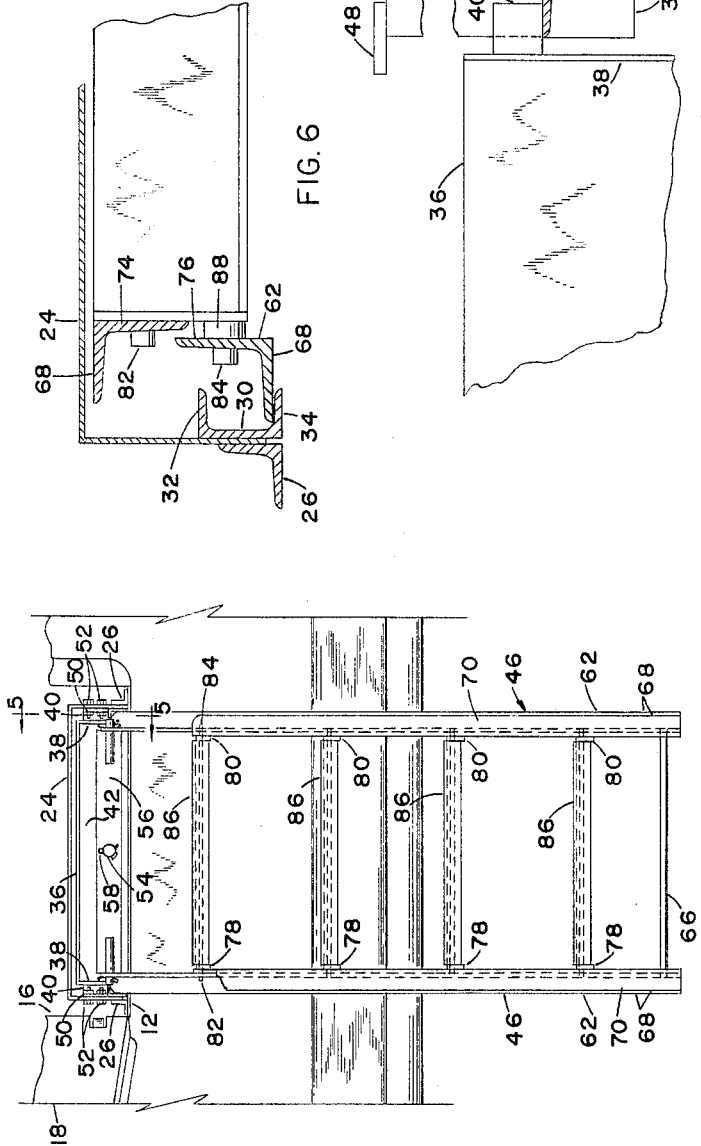
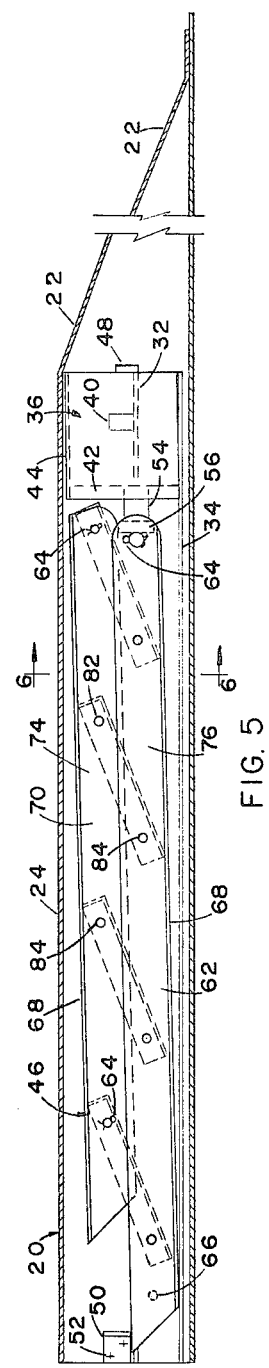
INVENTOR.
CARL S. GLATFELTER
BY
Otto Moeller
Attorney

United States Patent Office 3,291,255
Patented Dec. 13, 1966

3,291,255
BUS EMERGENCY STEPS
Carl S. Glatfelter, 1630 Monroe St., York, Pa.
Filed July 20, 1964, Ser. No. 383,796
4 Claims. (Cl. 182—88)

This invention relates to new and useful improvements in a step device, and more particularly to a novel emergency folding step device for application to a vehicle to allow the occupants to alight from the vehicle to the ground.

It is an object of the invention to provide a novel step device for a vehicle, as for example, a schoolbus, that provides safe exit from the vehicle by the occupants thereof and that is simple and convenient to manipulate to a position of use and to a storage position with a minimum of effort.

Another object is to provide a novel step device having upper and lower laterally spaced side rails and wherein the individual steps provide a pivotal linkage between the rails whereby the step device is foldable into an extremely compact condition.

A further object is to provide a step device of this type that is retractable and extensible in folded condition between a storage position within the confines of the vehicle and a position of use exteriorly thereof, and that occupies a minimum of space in storage position.

Still another object is to provide a step device of this type that is retractable into and extensible from a housing occupying a minimum of space in the vehicle and that in retracted storage position is protected by the housing against freezing rain, snow, mud and other conditions that militate against emergency use of the step device.

Yet another object is to provide a step device of this type which is pivotally secured to a support on the vehicle in such manner that in the extended and unfolded position of use of the step device, the lower ends of the rails will firmly engage the ground irrespective of the slope of the ground or tilted position of the vehicle, whereby to stabilize the step device during descent of the occupants from the vehicle to the ground.

Another object is to provide a novel step device of this type that is readily applicable to and removal from existing school buses or similar type vehicles.

These together with other objects and advantages of the invention will become apparent from the following description taken in connection with the accompanying drawings, in which:

FIGURE 2 is a fragmentary end elevation of the vehicle, with the novel step device applied thereto and shown in extended position of use;

FIGURE 4 is an enlarged fragmentary sectional view taken on line 4—4 of FIGURE 1;

FIGURE 5 is a sectional view through the step device housing, with the step device shown in its retracted, folded storage position within the housing; and FIGURE 6 is a fragmentary sectional view taken on line 6—6 of FIGURE 5.

Figures 1, 3:
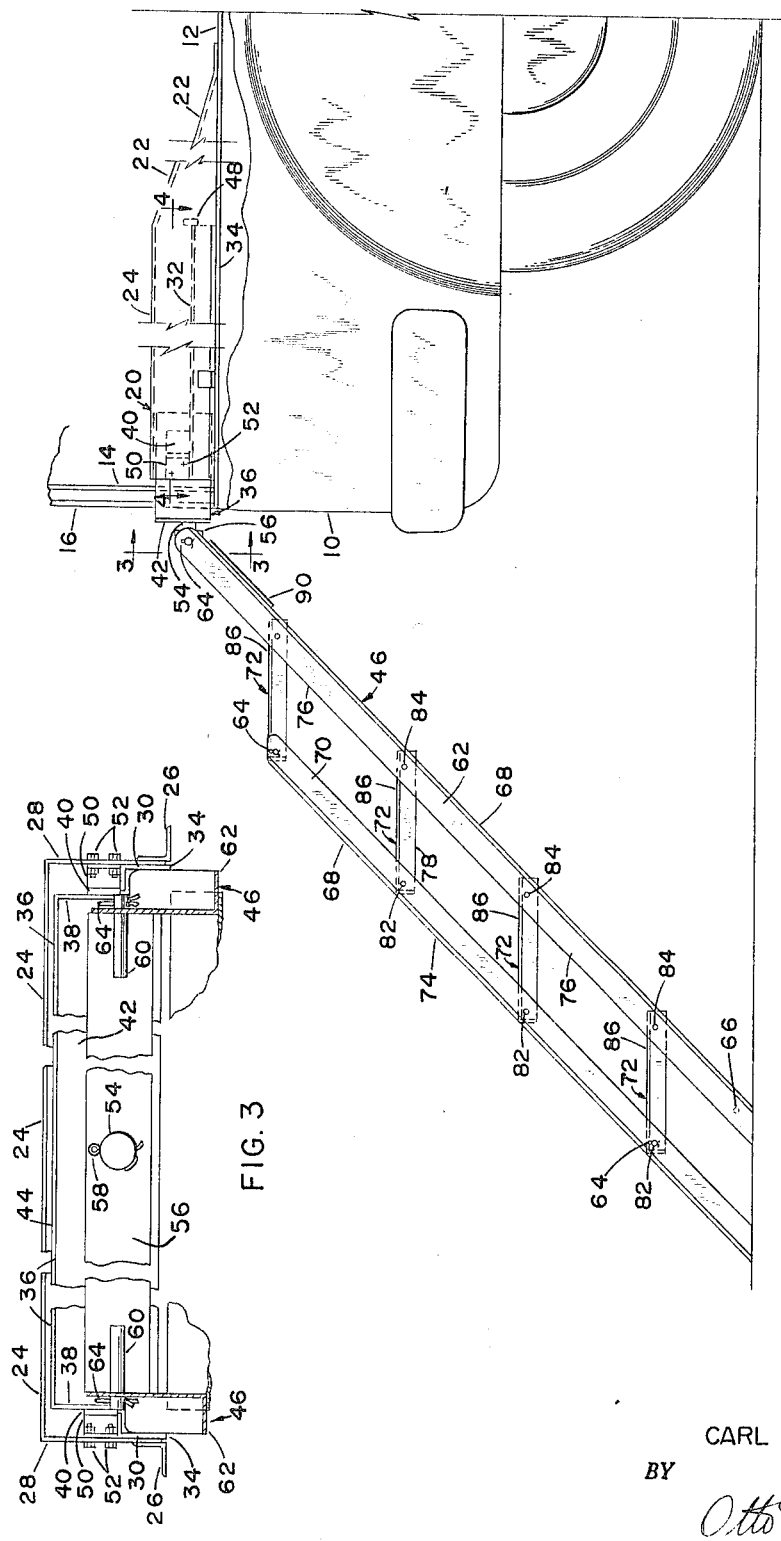
FIGURE 1 is a fragmentary side elevation of a vehicle, such as a school bus, parts being broken away, with the novel step device applied thereto and shown in extended position of use.
FIGURE 3 is an enlarged sectional view taken on line 3—3 of FIGURE 1, with parts broken away.

Referring to the drawings and more particularly to FIGURES 1 and 2 thereof, the reference numeral 10 indicates the lower rearward portion of a bus, more especially a school bus, with a preferred embodiment of the novel foldable extensible and retractable step device applied thereto. The bus is provided interiorly thereof with a floor 12. The rear wall 14 of the bus is provided intermediate the sides thereof with a door opening 16 extending down to the level of the floor 12. Mounted in conventional manner in the door opening 16 is an emergency door 18 arranged to swing outwardly to permit withdrawal of the step assembly into the illustrated position to allow the occupants of the bus, with particular emphasis on small school children, to alight in a safe and convenient manner.

A shallow, rectangular longitudinally elongated housing 20 is mounted on the floor 12 along the aisle of the bus and extends forwardly from just inside the door 18 for a distance sufficient to receive the step assembly in its retracted position. At its forward end the housing 20 is provided with an extension 22 sloping downwardly and forwardly from the top wall 24 of the housing 20 to the floor 12, forming a ramp whereby the occupants of the bus may traverse the top wall 24 of the housing 20 in walking to or from the rear of the bus without danger of stumbling or making a misstep. For convenience in description, the terms forward and rearward as applied to the step device are employed in the same sense as they apply to the forward and rearward ends of the bus.

The housing 20 is formed of suitable sheet metal, bent to a generally inverted U-shape in cross section, the gauge of the metal being such that the top wall 24 will support the weight of the bus occupants when walking therealong, without appreciable sagging thereof. One or more pairs of angle clips 26 are welded or otherwise suitably secured to the outer faces of the housing side walls 28, adjacent the lower marginal edges thereof, through which clips the housing 20 may be secured to the floor 12 by anchor bolts or other suitable fastening means. Secured in suitable manner, as by welding, to the inner face of each of the housing side walls 28, an extending longitudinally therealong adjacent the lower marginal edge thereof, is a channel member 30. The channel members 30 are adapted to rest on the floor 12 with their upper flanges 32 and their lower flanges 34 extending inwardly toward each other, whereby to form within opposite sides of the housing 20 slide runner supports for purposes hereinafter described.

A slide member 36 is mounted for longitudinal movement in the housing 20, and is preferably formed of suitable sheet metal bent to a generally inverted U-shape in cross section. The width of the slide member 36 is such that the side walls 38 thereof are disposed slightly inwardly of the free edges of the inturned flanges 32 and 34 of the housing channel members 30. Welded or otherwise suitably secured to the slide member side walls 38 are laterally outwardly projecting slide blocks 40, which are disposed approximately midway between the forward and rearward ends of the slide member 36 and approximately midway between the upper and lower ends thereof, so that they rest on the inturned upper flanges 32 of the housing channel members 30 to slidably support the slide member 36 in the housing 20.

A metal plate 42, welded or otherwise suitably secured to the rearward ends of the side walls 38 and top wall 44 of the slide member 36 forms a rear wall therefor, to which plate or rear wall 42 is pivotally connected the step assembly 46, hereinafter described in details. The weight of the step assembly 46 at its pivotal connection with the rear wall 42 of the slide member 36 tends to cock the slide member about the slide blocks 40. However, by providing a minimum clearance between the top wall 44 of the slide member 36 and the top wall 24 of the housing 20, engagement of the rearward edge of the slide member top wall 44 with the under side of the housing top wall 24, minimizes such cocking and retains the lower edge of the slide member side walls 38 clear of the floor 12. The binding action resulting from the slight cocking of the slide member 36 in the housing 20 is insufficient to in anywise appreciably interfere with withdrawing the step assembly from its nested position in the housing 20, as shown in FIGURE 5, or re-inserting it into nested position therein.

In order to limit withdrawl of the step assembly 46 from the housing 20 to its proper position for use and to limit re-insertion thereof into proper position in the housing 20, a pair of rearward stop members 48 and a pair of forward stop members 50 are provided. The rearward stop members 48 are preferably in the form of angle clips secured by bolts 52 or the like to the inner face of respective side walls 28 of the housing 20, and which clips or stop members 48 extend inwardly into the path of respective slide blocks 40 of the slide member 36. The slide blocks 40 and stop members 50 are disposed so that upon engagement, the rearward portion of the slide member 36 projects beyond the rearward end of the housing 20 and extends through the door opening 16 so that the projectnig top wall 44 thereof in effect forms a landing.

A pivot pin 54 is welded or otherwise rigidly secured to the slide member rear wall 42 centrally between the side edges and the top and bottom edges thereof and extends rearwardly therefrom, the longitudinal axis of the pivot pin 54 being perpendicular to the plane of the slide member rear wall 42. A transversely extending yoke 56 is pivotally mounted midway between its ends on pivot pin 54 and is retained thereon by suitable means, as by the cotter pin 58. Secured, as by welding, to opposite end portions of the yoke 56 are laterally outwardly projecting pivot pins 60.

A pair of longitudinally extending laterally spaced lower side rail members 62, of the step assembly 46, are pivotally mounted at their forward ends on the projecting portions of the pivot pins 60, and are retained thereon by suitable means, as by the cotter pins 64. It will be seen that the pivot pins 60 permit pivotal lowering of the step assembly 46, upon withdrawal thereof from the housing 20, to the inclined position shown in FIGURE 1, with the rearward ends of the lower side rail members resting on the ground. It will also be seen that if the ground is sloped laterally with respect to the longitudinal vertical central plane of the bus, as in the case of a crowned road, or if the bus is tilted with respect to the ground level for any reason, the pivot pin 54 permits pivotal tilting of the step assembly 46 so that the rearward ends of the lower side rail members 62 will be firmly planted on the ground, whereby to insure stability of the step assembly 46 when the occupants descend from the bus to the ground.

The lower side rail members 62 are preferably of angle form in cross section and for purpose of lightness are preferably made of aluminum. A transversely extending rod or pipe 66, is rigidly secured at its ends by welding or other suitable means to the lower ends of side rail members 62, serving to rigidify the step assembly 46 and also providing means whereby the step assembly 46 may be grasped to permit convenient withdrawal thereof from the housing 20 and re-insertion therein. The side rail members 62 are spaced a distance apart so that the free longitudinal end portion of their out-turned flanges 68 will ride on the in-turned lower flanges 34 of the housing 20 when withdrawing or re-inserting the step assembly 46.

A pair of longitudinally extending laterally spaced upper side rail members 70, of the step assembly 46, are pivotally connected with the lower side rail members 62 by the individual steps 72 in the manner hereinafter described. The side rail members 70 are preferably of angle form in cross section and for purpose of lightness are preferably made of aluminum. The upper side rail members 70 are spaced laterally apart a distance somewhat less than the lower rail members 62, so that in folded or collapsed position of the step assembly 46, the vertical flanges 74 of the upper side rail members 70 partially telescope within the vertical flanges 76 of the lower side rail members 62, as shown in FIGURES 5 and 6, whereby the housing 20 may be made quite shallow to accommodate the folded step assembly 46.

Each of the individual steps 72 comprises a pair of laterally spaced side bars 78 and 80, and a pair of transverse rods 82 and 84 extending through and projecting beyond the opposite end portions of the side bars 78 and 80; the rods 82 and 84 being suitably rigidly secured to the side bars 78 and 80 as by tack welding. The laterally projecting end portions of the rods 80 extend freely through the vertical flanges 74 of the upper side rail members 70 and the laterally projecting end portions of the rods 82 extend freely through the vertical flanges 76 of the lower side rail members 62, whereby the individual steps 72 pivotally connect the upper and lower side rail members 70 and 62. Each of the individual steps 72 is completed by a tread plate 86 secured, as by welding, along its opposite side edges to the laterally spaced side bars 78 and 80. The steps 72 are arranged to fit closely between the inner faces of the vertical flanges 74 of the upper side rail members 70. Spacers 88 on the rods 84 take up the space between the sides of the steps 72 and the inner faces of the vertical flanges 76 of the lower side rail members 62.

It will be observed that the spacing of the pivotal connections of the steps 72 with the lower side rail members 62, measured from the rearward ends of the rail members 62, is the same as the spacing of the pivotal connections of the steps 72 with the upper side rail members 70, measured from the rearward ends of the rail members 70, so that when the step assembly 46 is withdrawn and unfolded into the position shown in FIGURE 1, with the rearward ends of the side rail members 62 and 70 resting on the ground, the steps 72 will be in a substantially horizontal position. It will also be observed that the upper side rail members 70 are shorter than the lower side rail members 62, and that the top step 72 is pivotally connected to the foremost ends of the upper side rail members 70 and is pivotally connected to the lower side rail members 62 a distance rearward of their foremost ends, as best shown in FIGURE 1. This distance is such that when the upper side rail members 70 are pivotally rotated in a forward direction from the position shown in FIGURE 1 to the folded condition of the step assembly 46, the foremost ends of the upper side rail members 70 substantially coincide with the foremost ends of the lower side rail members 62 so as to clear the rear wall 42 of the slide member 36.

Since the forward end of the tread plate 86 of the top step 72 is disposed a longitudinal distance rearward of the rearward end of the landing formed by top wall 44 of slide member 36 in the operative position of the step assembly 46, a kick plate 90 is rigidly secured to the out-turned flanges 68 of the side rail members 62 spanning the space between the side rail members 62 and substantially the space between the forward end of the top step 72 and the rearward end of the slide member 36, to insure against stepping through this space in stepping from the landing 44 of slide member 36 to the top step 72.

In an emergency, or for any other reason, should it be desired or necessary to leave the vehicle or bus from the rear by way of the emergency door 18, an occupant, preferably one of the older students in the case of a school bus opens the door 18 and jumps to the ground. He there grasps the rod 66 and pulls the folded step assembly 46 rearward from the position shown in FIGURE 5, the extent of such withdrawal being limited by engagement of the slide member slide blocks 40 with the stop members 48, and lowers the rearward end of the step assembly 46 so that the rerward ends of the lower side rail members 62 rest on the ground. He then swings the upper side rail members 70 and the steps 72 rearward and downwardly from their folded position between the lower side rail members 62 to the position shown in FIGURE 1. By reversing this procedure, the step assembly 45 may be re-folded and re-inserted in the housing 20 in its nested position, as shown in FIGURE 5.

While the invention, as illustrated and described, is particularly adapted for convenient application to existing buses, it is apparent that where the structure of the bus is such as to permit, the housing for the step assembly may be mounted on the underside of the floor. New buses may, of course, be constructed in suitable manner for application of the housing for the step assembly in any desired relation with respect to the floor level of the bus.

From the foregoing, it is evident that I have provided a highly desirable emergency step device that is light in construction but nevertheless rigid in nature, that is conveniently withdrawn to a position of use and retracted to a storage position, and that is folded for storage in a minimum of space. It is also evident that the step assembly in its stored position is entirely enclosed, protecting it from snow, freezing rain, mud and other conditions that would otherwise make it difficult or impossible to move the step assembly into a position of use in an emergency.

I claim:

1. A step device comprising a support and a folding step assembly, said support including a transversely extending yoke having a pivotal mounting intermediate its ends for pivotal movement thereof about a longitudinally extending axis, said folding step assembly including a pair of transversely spaced lower side rails each pivotally connected at one end to a respective end of said transversely extending yoke, a pair of transversely spaced upper side rails, a plurality of rectangular steps, each of said steps at one pair of opposed corners having a pivotal connection with a respective lower side rail and at the other pair of opposed corners having a pivotal connection with a respective upper side rail, said pivotal connections being spaced along said side rails to define parallelograms between said steps and the side rail portions therebetween, whereby said folding step assembly is adapted to be pivotally folded to a collapsed position and pivotally unfolded to a distended position of use.

2. A step device for a vehicle comprising an elevated support carried by said vehicle and a folding step assembly, said folding step assembly including a pair of transversely spaced lower side rails each pivotally connected at one end to an end of said support for pivotally swinging said folding step assembly to an inclined position between said end of said elevated support and ground level, a pair of transversely spaced upper side rails, and a plurality of steps pivotally connected with said lower and upper side rails forming linkages therebetween to allow said upper side rails to be swung upwardly and forwardly into juxta-position with respect to said lower side rails for folding said folding step assembly into collapsed condition to allow said upper side rails to be swung rearwardly and downwardly into spaced relation with respect to said lower side rails for unfolding said folding step assembly into distended condition, the top step having its pivotal connections with said upper side rails disposed at the upper forward ends of said upper side rails and having its pivotal connections with said lower side rails disposed a distance spaced lengthwise therealong from the upper forward ends of said lower side rails to bring the upper ends of said upper and lower side rails in coterminal relation adjacent the said end of said support in the collapsed position of said upper and lower side rails.

3. A step device for a vehicle as set forth in claim 2, including a slidable mounting in said vehicle for said support for slidably guiding said folding step assembly in its collapsed condition between a retracted storage position within the confines of said vehicle and an extended position of use without the confines of said vehicle.

4. A step device for a vehicle body comprising, a folding step assembly including a pair of transversely spaced lower side rails, a pair of transversely spaced upper side rails and a plurality of steps pivotally connected with said lower and upper side rails forming linkages therebetween for selectively folding and unfolding said folding step assembly to a collapsed and a distended position; a housing in said vehicle body having a height, width and length to enclose said folding step assembly in its collapsed position only; support means guidingly supporting said folding step assembly for insertion in said housing and withdrawal therefrom in said collapsed position; and means pivotally connecting one pair of said side rails at one end thereof to said support means for vertical swinging movement of said folding step assembly about a transversely extending axis and for lateral swinging movement about a longitudinally extending axis upon withdrawal thereof from said housing, said last named pivotal connecting means including a transversely extending yoke pivotally mounted intermediate its ends to said support means, and each of said lower side rails being pivotally connected to a respective end of said transversely extending yoke.

References Cited by the Examiner

UNITED STATES PATENTS

| 290,348 | 12/1883 | Olsen | 182—97 |
|---|---|---|---|
| 708,670 | 9/1902 | See | 182—161 |
| 2,647,677 | 8/1953 | Reed | 182—88 |
| 2,743,861 | 5/1956 | Mattis | 182—95 |
| 2,863,594 | 12/1958 | Shafer | 182—88 |
| 2,969,850 | 1/1961 | Hillis | 182—88 |

FOREIGN PATENTS

| 22,873 | 11/1893 | Great Britain. |
|---|---|---|
| 176,399 | 8/1961 | Sweden. |

REINALDO P. MACHADO, *Primary Examiner.*